United States Patent [19]
Kato et al.

[11] Patent Number: 5,636,589
[45] Date of Patent: Jun. 10, 1997

[54] ANALOG INDICATOR WITH SELF-LUMINESCENT POINTER

[75] Inventors: Miki Kato, Kariya; Kazuhiko Miyazaki, Aichi-ken, both of Japan

[73] Assignee: Nippondenso Co., Ltd., Kariya, Japan

[21] Appl. No.: 342,006

[22] Filed: Nov. 16, 1994

Related U.S. Application Data

[63] Continuation-in-part of Ser. No. 108,516, Aug. 18, 1993, Pat. No. 5,372,087.

[30] Foreign Application Priority Data

Aug. 24, 1992 [JP] Japan .................. 4-224413

[51] Int. Cl.6 ............................ G01D 13/22
[52] U.S. Cl. ................. 116/286; 116/328; 116/332
[58] Field of Search ................. 116/286, 287, 116/288, 328, 332, DIG. 6, DIG. 36; 362/29; 368/238

[56] References Cited

U.S. PATENT DOCUMENTS

| | | |
|---|---|---|
| 2,792,803 | 5/1957 | Hardesty . |
| 3,066,643 | 12/1962 | Flanagan, Jr. . |
| 3,219,008 | 11/1965 | Harris et al. . |
| 4,163,428 | 8/1979 | Ishikawa . |
| 4,257,084 | 3/1981 | Reynolds ............... 362/31 |
| 4,300,470 | 11/1981 | Furukawa .............. 116/332 |
| 5,161,872 | 11/1992 | Sasaki et al. . |
| 5,211,128 | 5/1993 | Katoh et al. . |

FOREIGN PATENT DOCUMENTS

| | | | |
|---|---|---|---|
| 4215150 | 11/1993 | Germany ............. 116/288 |
| 4204323 | 7/1992 | Japan . |
| 4208813 | 7/1992 | Japan . |
| 6050776 | 2/1994 | Japan ............... 116/328 |

*Primary Examiner*—William A. Cuchlinski, Jr.
*Assistant Examiner*—Willie Morris Worth
*Attorney, Agent, or Firm*—Cushman, Darby & Cushman IP Group of Pillsbury Madison & Sutro LLP

[57] ABSTRACT

A self-luminescent indicator which may be employed in a tachometer, a speedometer, or other such gauges in automotive vehicles. The self-luminescent indicator comprises an indicating pointer, a luminescent element, and a semitransparent member. The indicating pointer includes a housing and a cover. The housing has formed therein a groove. The luminescent element is disposed in the groove of the housing. The semitransparent member is arranged within the cover of the indicating pointer for diffusing light emitted from the luminescent element out of the indicating pointer. The semitransparent member has side walls extending substantially parallel to each other in a vertical direction parallel to a given optical path of the luminescent element. With this arrangement, the indicating pointer projects light having uniform and high brightness to an observer without having the light experience total reflection in the semitransparent member so as to improve the visibility of pointer deflection over a dial plate.

28 Claims, 12 Drawing Sheets

ANALOG INDICATOR WITH SELF-LUMINESCENT POINTER

This application is a continuation-in-part of application Ser. No. 08/108,516, filed Aug. 18, 1993, now U.S. Pat. No. 5,372,087, issued Dec. 13, 1994.

BACKGROUND OF THE INVENTION

1. Technical Field of the Invention

The present invention relates generally to an improvement on an analog indicator which may be employed in a tachometer, a speedometer, or other such gauges in an automotive vehicle. More particularly, the invention is directed to an analog indicator including a self-luminescent indicating pointer which is designed to project light, having uniform brightness, so as to clearly illuminate the indicator's deflection to an observer.

2. Background Art

Japanese Patent First Publication No. 4-204323, assigned to the same assignee as the present application, discloses a self-luminescent pointer device for a gauge which may be used with an automotive speedometer or a tachometer. This conventional pointer device includes a plurality of light emitting diodes (LEDs) arranged in an indicating pointer to improve the visibility of pointer deflection over a dial plate. The present invention represents an improvement on a pointer structure taught in this prior art for projecting light having uniform and high brightness out of an indicating pointer so as to further enhance the visibility of pointer deflection over a dial plate.

SUMMARY OF THE INVENTION

It is an object of the present invention to provide an analog indicator which is simple in design and which is designed to project light to an observer having uniform and high brightness, and which clearly illuminates pointer deflection over a dial plate.

According to one aspect of the present invention, there is provided a self-luminescent indicator apparatus which comprises an indicating pointer having a housing having formed therein a groove and a cover for covering the housing, a luminescent element disposed in the groove of the housing of the indicating pointer, and a semitransparent member disposed within the cover of the indicating pointer for dispersing light emitted from the luminescent element out of the indicating pointer. The semitransparent member has side walls which are geometrically oriented to direct the light falling on the side walls outward.

In the preferred mode, the side walls of the semitransparent element are so oriented that the light, emitted from the luminescent element, falling on the side walls reaches an end of the semitransparent element through which the light exits without occurrence of total reflection. Additionally, the side walls of the semitransparent element are oriented symmetrically with respect to a given center line of the luminescent element. For example, the side walls of the semitransparent element may extend parallel to each other. Alternatively, the side walls of the semitransparent element may be both inclined at a given angle to a bottom of the groove on which the luminescent element is disposed.

A lens may be provided interposed in the groove of the housing between the cover of the indicating pointer and the luminescent element for directing the light emitted from the luminescent element to the semitransparent member.

The side walls of the semitransparent member may be oriented parallel to the center line of the groove of the housing which extends perpendicular to the bottom of the groove on which the luminescent element is disposed.

The groove of the housing has an opening oriented to the semitransparent member. The width of the opening is substantially equal to that of an end of the semitransparent member facing the groove.

The groove of the housing has flat side walls which are oriented to direct the light emitted from the luminescent element to the semitransparent element.

The groove of the housing has a first end into which the light emitted from the luminescent element enters and a second end from which the incoming light exits. The second end is greater in area than the first end.

The luminescent element includes a plurality of light-emitting elements arranged along a given length of the groove.

The lens disposed in the groove of the housing has a corrugated surface which is formed with a plurality of triangle pole-like protrusions facing the cover of the indicating pointer.

The cover has a groove in which the semitransparent member is fitted and which has side walls extend parallel to each other with respect to a given optical path of the luminescent element. The side walls of the groove of the housing is oriented in alignment with the side walls of the groove of the cover.

The lens may alternatively be partly inserted into both the grooves of the cover and the housing for directing the light emitted from the luminescent element to the semitransparent element.

The side walls of the groove of the cover may be inclined relative to the given optical path of the luminescent element at a preselected angle so as to direct the light falling thereon out of the indicating pointer. The side walls of the groove of the housing may also be inclined relative to the given optical path of the luminescent element so as to direct the light falling thereon to an end of the semitransparent member into which the light enters.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the drawings.

DESCRIPTION OF THE PREFERRED EMBODIMENT

Figure 1:
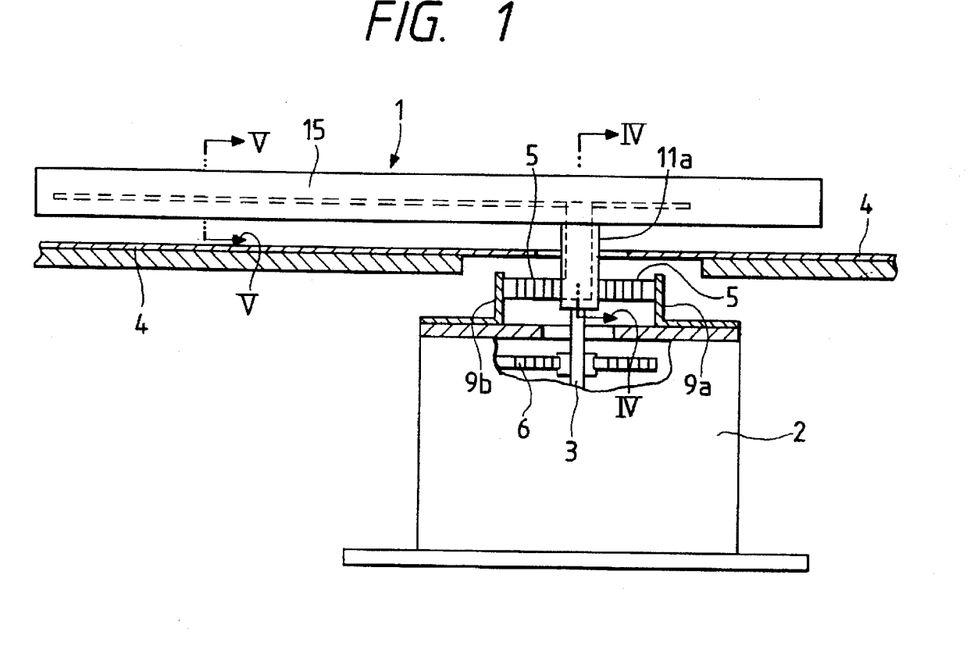
FIG. 1 is a partial cross sectional view which shows a self-luminescent indicator according to the present invention.

Referring now to the drawings, wherein like numbers refer to like parts in several views, particularly to FIG. 1, there is shown a self-luminescent indicator apparatus according to the present invention which may be employed in a tachometer or a speedometer for automotive vehicles, for example.

Figure 2:
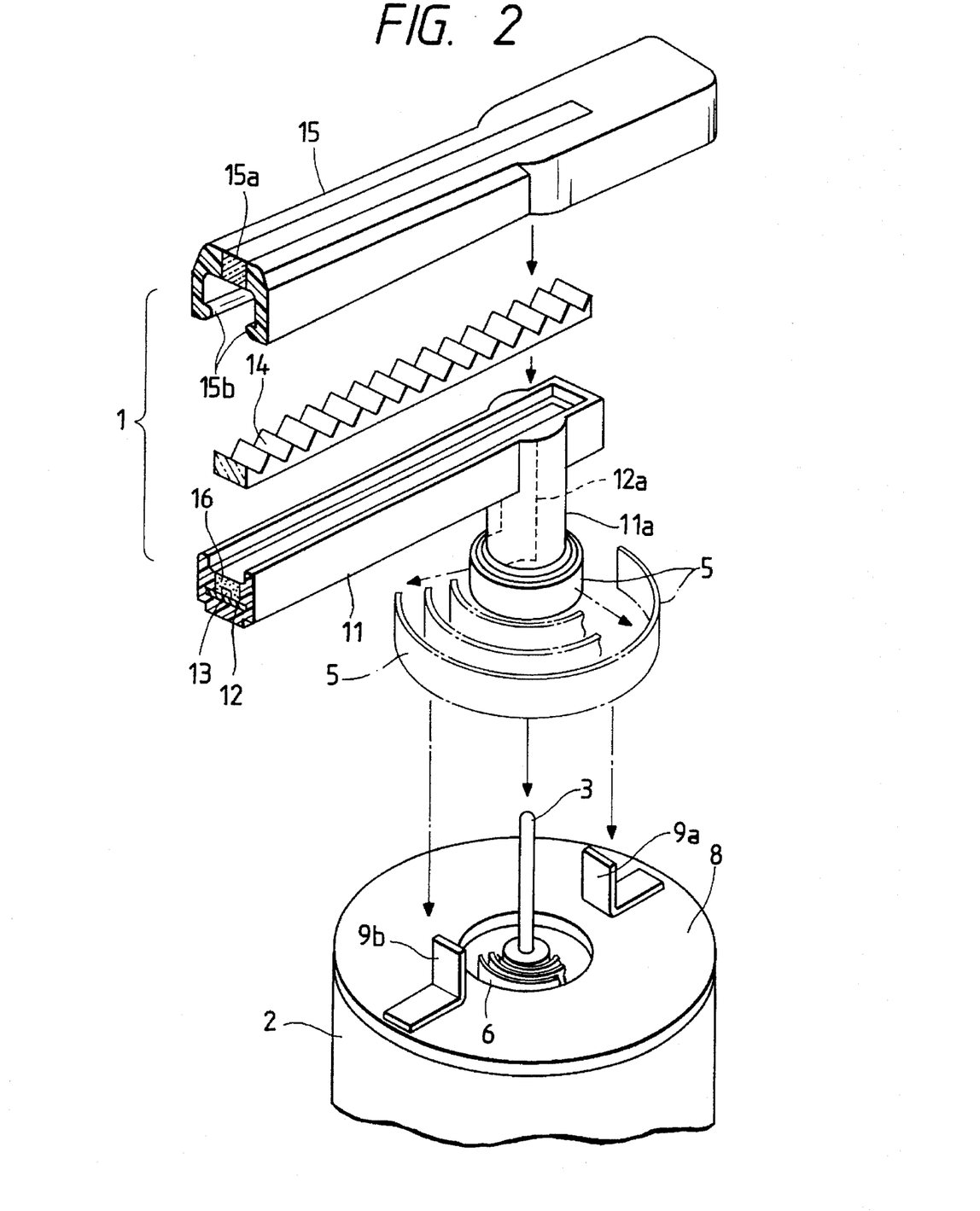
FIG. 2 is an exploded perspective view which shows the self-luminescent indicator as shown in FIG. 1.
Figure 3:
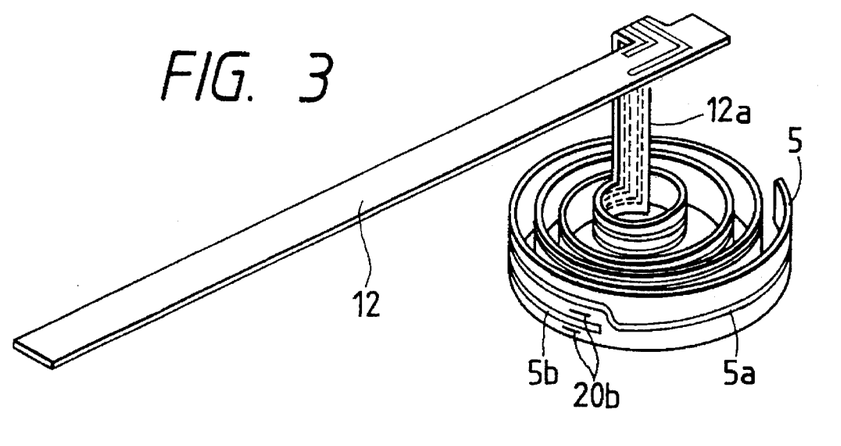
FIG. 3 is a perspective view which shows flexible printed circuits 12 and 5.
Figure 4:
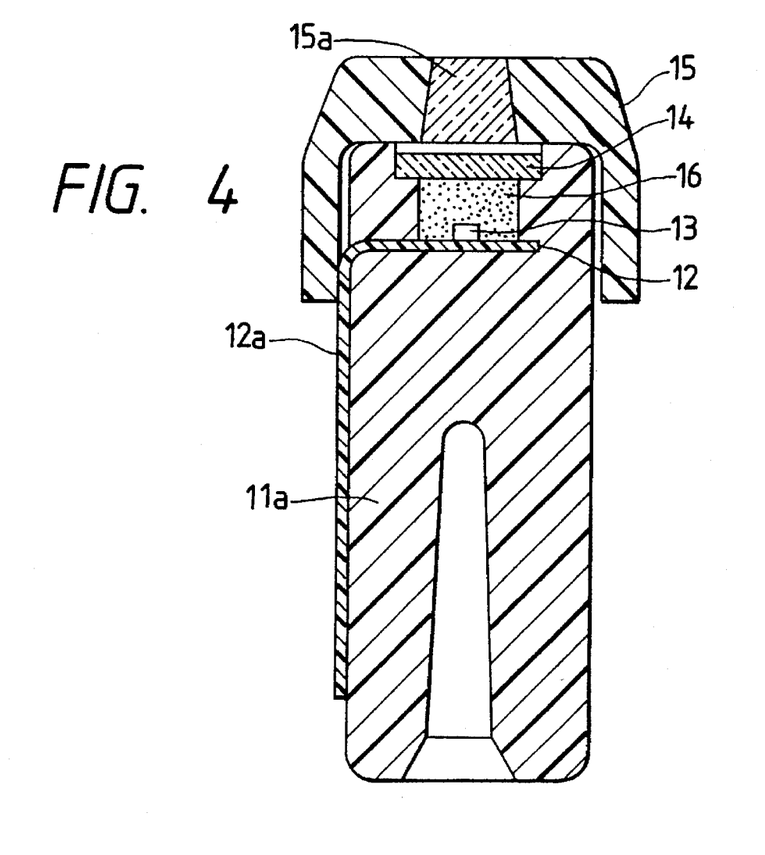
FIG. 4 is an enlarged cross sectional view taken along the line IV—IV in FIG. 1.

The self-luminescent indicator apparatus includes generally a pointer driving unit 2 secured to a meter casing (not shown), a pointer support shaft 3 extending upward from the pointer driving unit, a self-luminescent indicating pointer 1 supported on a top end of the pointer support shaft 3, a flexible printed circuit 5 (hereinafter, referred to as an FPC), and a character display plate 4 (i.e., a dial) on which notches are printed. The FPC 5 is, as shown in FIGS. 2 and 3, provided with a strip plate which is wound around an outer surface of the pointer support shaft several times on a plane in a scroll fashion and which electrically communicates with self-luminescent elements such as light emitting diodes (LEDs) arranged within the indicating pointer 1.

The pointer driving unit 2 is of a cross coil type which is responsive to an input signal representative of an indicating parameter such as engine or vehicle speeds to provide torque to the pointer support shaft 3. A hairspring 6 is attached to its end to the pointer support shaft 3 for providing a reaction force against the torque produced by the cross coil so that the indicating pointer 3 is held at a position where the torque by the cross coil and spring forces of the scroll FPC 5 and the hairspring 6 are balanced.

The self-luminescent indicating pointer 1, as shown in FIGS. 2 to 5, includes a housing 11, a flexible printed circuit (FPC) 12 arranged in the housing 11 extending in a longitudinal direction, a plurality of LEDs 13, a transparent synthetic resin member 16 arranged on the FPC 12, a dioptric lens 14 disposed on the resin member 16, and a cover 15 put on the housing 11.

Figure 5:
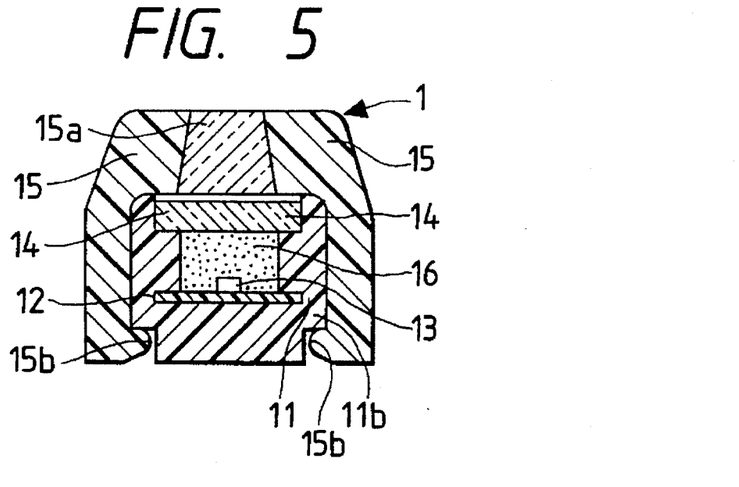
FIG. 5 is an enlarged cross sectional view taken along the line V—V in FIG. 1.

The housing 11 is made of a synthetic resin and includes a square rod member having therein a groove extending in a longitudinal direction and a boss 11a integrally formed on an end portion of the rod member projecting downward therefrom. A bore 11c is formed in the bottom portion of the boss 11a into which the pointer support shaft 3 is inserted for rotatably supporting the indicating pointer 1. On both lower edges of the housing 11, as shown in FIG. 5, shoulder portions 11b are formed. The FPC 12 arranged in the groove of the housing 11 may be provided in a manner wherein an insert (i.e., FPC 12) is disposed within a mound when forming the housing 11.

The cover 15 is made of a black synthetic resin and includes, as shown in FIG. 2, in a longitudinally central portion a semitransparent strip member 15a made of a translucent medium which assumes luminous diffusion characteristics. On both longitudinal edge portions of the cover 15, hook portions 15b are formed which project inward for firm engagement with the shoulder portions 11b of the housing 11.

The FPC 12 disposed in the housing 11 has thereon a conductive pattern on which the LEDs 13 are mounted at regular intervals. Additionally, the FPC 12 is, as shown in FIG. 3, formed integrally with the scroll FPC 5 through a connecting FPC 12a extending in parallel to the boss 11a.

Figure 6:
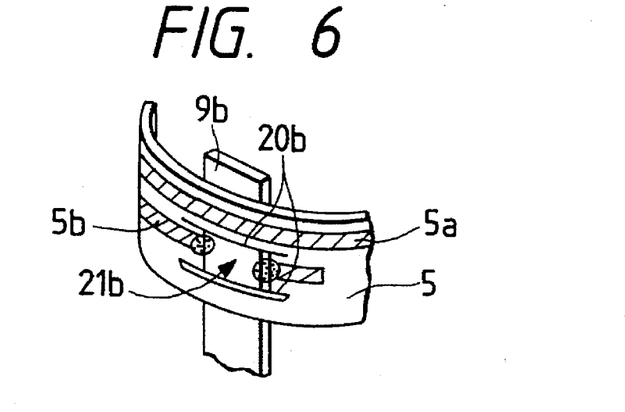
FIGS. 6 and 7 are enlarged perspective views which show terminal portions of a flexible printed circuit 5.
Figure 7:
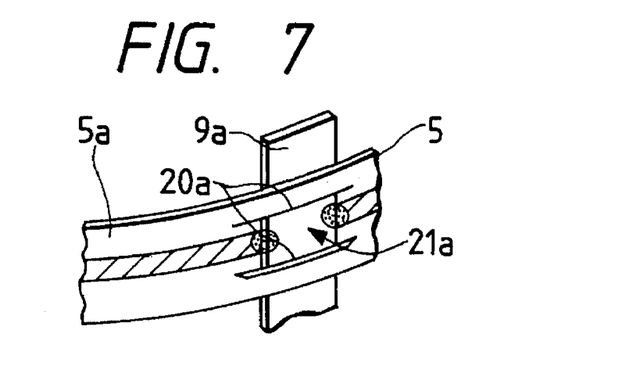
Figure 8:
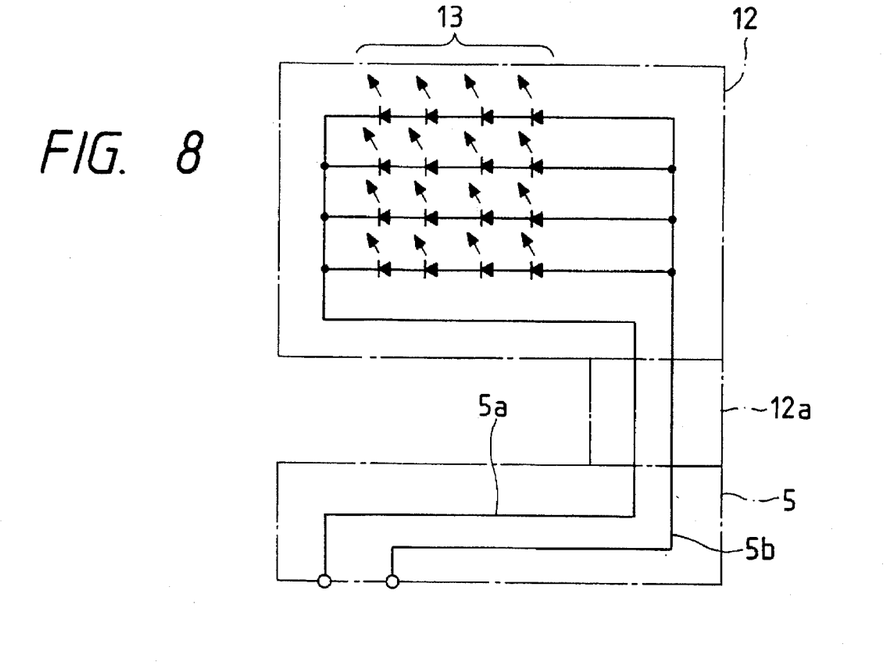
FIG. 8 is a circuit diagram which shows a conductive pattern of a flexible printed circuit 12 on which light emitting diodes are mounted.

The FPCs 5, 12, and 12a may be formed in a manner wherein a conductive pattern made of a copper film is formed over a surface of a base film made of a polyimide resin and an insulating film is then coated on an area of the conductive pattern other than terminals 21a and 21b, as shown in FIGS. 3, 6, and 7.

As stated above, on the conductive pattern of the FPC 12, a plurality of rows each including some LEDs 13 arranged in series are mounted in parallel at regular intervals between positive and negative lead wires 5a and 5b which are printed over surfaces of the FPC 12, the connecting FPC 12a and the scroll FPC 5 in lengthwise directions thereof.

The printed lead wire 5b, as shown in FIG. 3, terminates at a position apart from the end of the scroll FPC while the printed lead wire 5a leads to the end thereof. When mounting the FPC 5 on the pointer driving unit 2, two terminal plates 9a and 9b secured on a terminal disc 8 of the pointer driving unit are, as shown in FIGS. 6 and 7, inserted into two pairs of slits 20a and 20b each formed in portions of the FPC 5 adjacent the ends of the printed wires 5a and 5b respectively and contact areas of the terminal plates 9a and 9b with the printed lead wires 5a and 5b are then soldered to electrically connect therebetween. The terminal plates 9a and 9b are connected to an indicator lighting circuit (not shown) so that lighting current is supplied to the LEDs 13 through the lead wires 5a and 5b.

Figure 9:
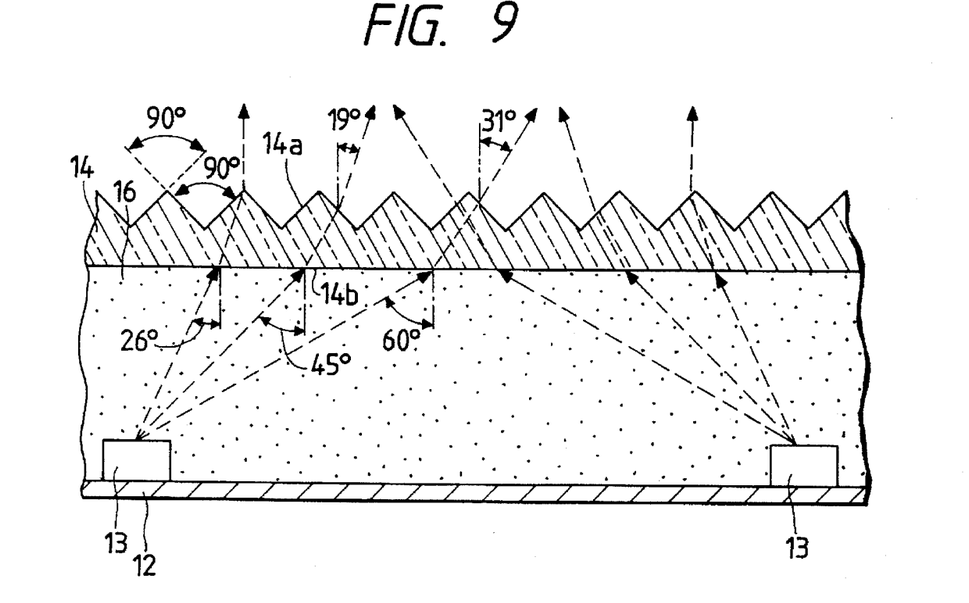
FIG. 9 is a cross sectional view which shows optical paths of lights refracted by a lens 14 which are emitted from LEDs mounted on a flexible printed circuit 12.

The lens 14 disposed on the transparent synthetic resin member 16, as shown in FIG. 9, includes a bar member having thereon corrugated, or notched surface 14a wherein angles of top ends and bottoms of the notched surface 14a represent 90 deg. respectively so that lights emitted from the LEDs 13 are projected to be uniform in brightness from the semitransparent strip portion 15a of the indicating pointer 1 in a longitudinal direction thereof.

When mounting the self-luminescent indicating pointer 1 on the pointer driving unit 2, the scroll FPC 5 is first temporarily tacked to the outer periphery of the boss 11a. The lens 14 is, as shown in FIG. 2, then fitted into the upper groove of the housing 11, after which the cover 15 is put on the housing 11 with the hook portion 15b engaging the shoulder portions 11b. Afterwards, the pointer support shaft 3 projecting from the pointer driving unit 2 is pressed into the bore 11c of the boss 11a so that the indicating pointer 1 is rotatably supported by the pointer driving unit 2. Finally, the temporal tack of the scroll FPC 5 to the boss 11a is released. The terminal plates 9a and 9b of the pointer driving unit 2 are, as shown in FIGS. 6 and 7, then inserted into the slits 20a and 20b of the FPC 5 and these are firmly fixed to each other.

In operation, when the cross coil of the pointer driving unit 2 is energized according to an input signal indicative of an indicating parameter, it will cause the self-luminescent indicating pointer 1 to be rotated while the scroll FPC 5, secured between a rotatable member (i.e., the indicating pointer) and a stationary member (i.e., the terminal disc 8 of the pointer driving unit 2), is deformed, or flexed and held at a position where the driving torque of the pointer driving unit 2 is balanced with the reaction torques produced by the scroll FPC 5 and the hairspring 6 of the pointer driving unit 2 to point toward an indicating parameter value on the display plate 4. In this arrangement, a Young's modulus of the scroll FPC 5 is much smaller than that of the hairspring 6 and thus the indicating pointer 1 may be rotated by torque similar to a conventional type without affecting the indicating accuracy of the indicating pointer 1.

Additionally, it is often the case that the scroll FPC 5 is rotated considerably to cause adjacent scroll surfaces of the FPC 5 to contact with each other, however as the conductive pattern of the FPC 5 is covered with the insulating film, a short circuit as well as noise with which an observer feels uncomfortable do not occur.

The LEDs 13 in the indicating pointer 1 are responsive to lighting current carried from the lighting circuit (not shown) through the terminal plates 9a and 9b, the scroll FPC 5, and the connecting FPCs 12a and 12 to be energized so that they glow to produce light which is dispersed from the semi-transparent portion 15a of the cover 15 of the indicating pointer 1 toward the indicator observer in the following manner.

The light beams projected from the LEDs 13 arranged on the FPC 12, as shown in FIG. 9, enter the lens 14 through the transparent synthetic resin member 16 at different incident angles. For example, when an incident angle represents 26 deg., the light beam is projected from the lens 14 at a refractive angle of zero, when the incident angle represents 45 deg., the refractive angle becomes 19 deg., and when the incident angle shows 60 deg., the refractive angle becomes 31 deg. It will be appreciated that the light entering the lens 14 at any angle may be led toward the upper surface 14a of the lens 14 so that the indicating pointer 1 projects the light uniformly in brightness over a preselected length thereof.

Figures 10, 11:
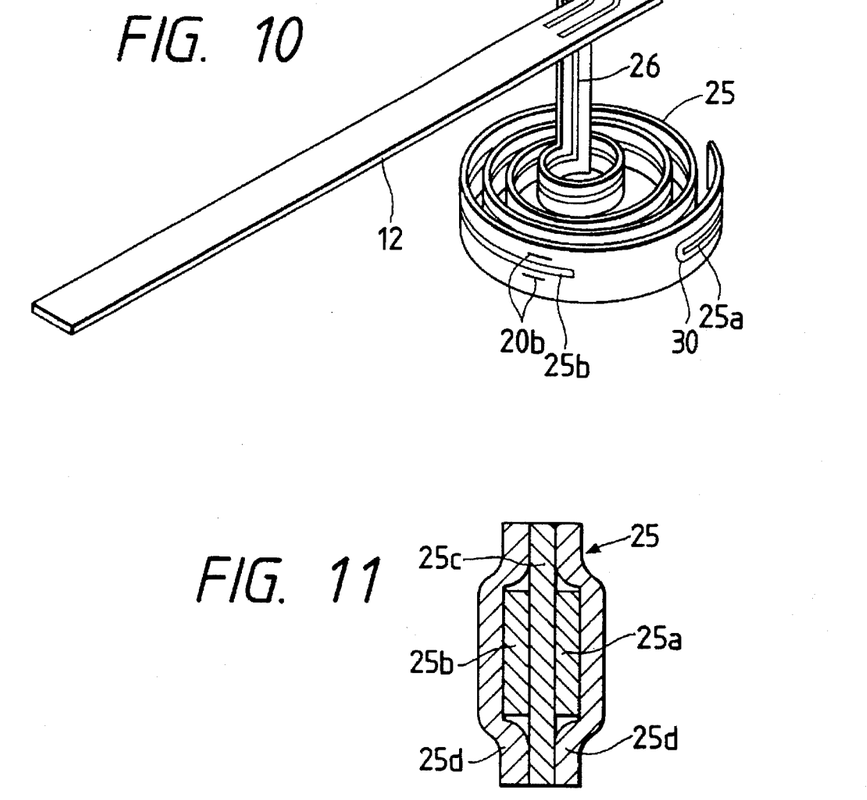
FIG. 10 is a perspective view which shows a modification of a flexible printed circuit.
FIG. 11 is an enlarged cross sectional view which represents the flexible printed circuit as shown in FIG. 10.

Referring to FIGS. 10 and 11, there is shown a modification of the scroll FPC.

The shown FPC 25 includes a base film 25c, conductive patterns 25a and 25b, and insulating film 25d. The conductive patterns 25a and 25b are formed on both surfaces of the base film and covered with the insulating films 25d respectively. Similar to the first embodiment, the inner conductive pattern 25b extends to the end of the FPC 5, while the outer conductive pattern 25b extends to a position diametrically opposite the end of the inner conductive pattern 25b with respect to the center of the scroll. Additionally, an elongated aperture 30 is formed in the outer surface of the FPC 5 to expose the inner conductive pattern 25a outside the base film 25c to make a contact with the terminal plate 9a inserted into the slits 20a in the FPC 5 in the same manner as the first embodiment. The outer conductive pattern 25b is also connected to the terminal plate 9b through the slits 20b.

It will be noted that the arrangement of this embodiment makes it possible to substantially reduce the width of the FPC by half as compared with the first embodiment wherein the conductive pattern is formed on one side surface of the base film 5. Accordingly, the length of the pointer support shaft 3 may be shortened further.

Figure 12:
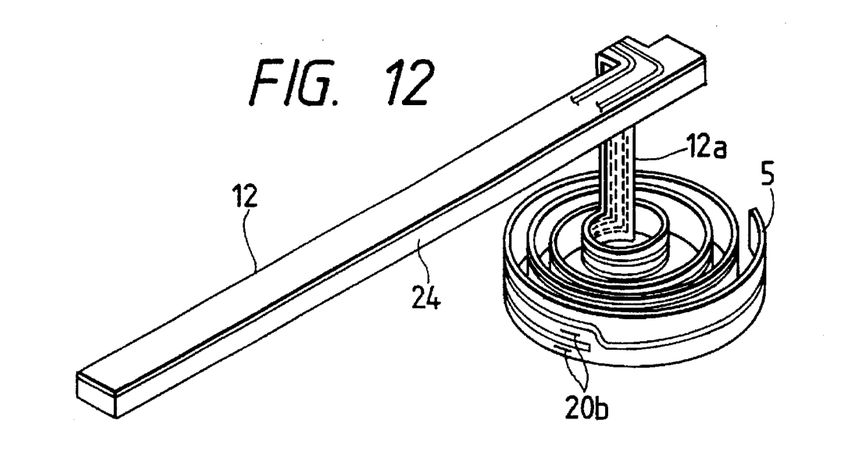
FIG. 12 is a perspective view which shows a third embodiment of a flexible printed circuit including a reinforcement member.
Figure 13:
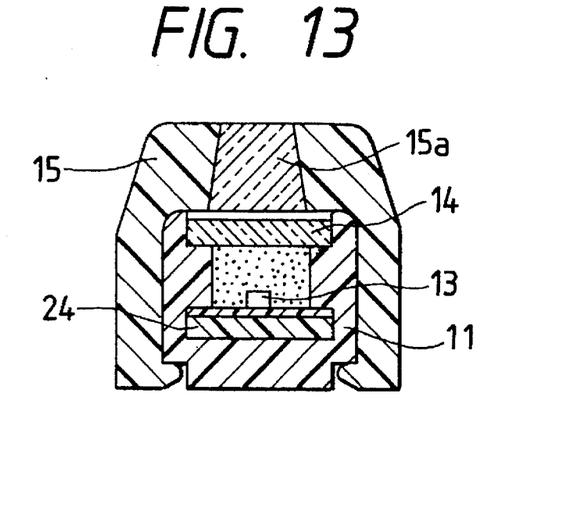
FIG. 13 is an enlarged cross sectional view which shows an indicating pointer in which the flexible printed circuit, as shown in FIG. 12, is arranged.

Referring to FIGS. 12 and 13, there is shown a third embodiment according to the present invention.

This embodiment is different from the first embodiment only in that a reinforcement member 24 is attached to a bottom surface of the FPC 12. The reinforcement member 24 may be made of an epoxy resin or the like and designed to reinforce flexibility of the FPC 12 in a lengthwise direction for preventing the indicating pointer 1 from bending and also prevents disconnection of the LEDs 13 with the FPC 12.

Figure 14:
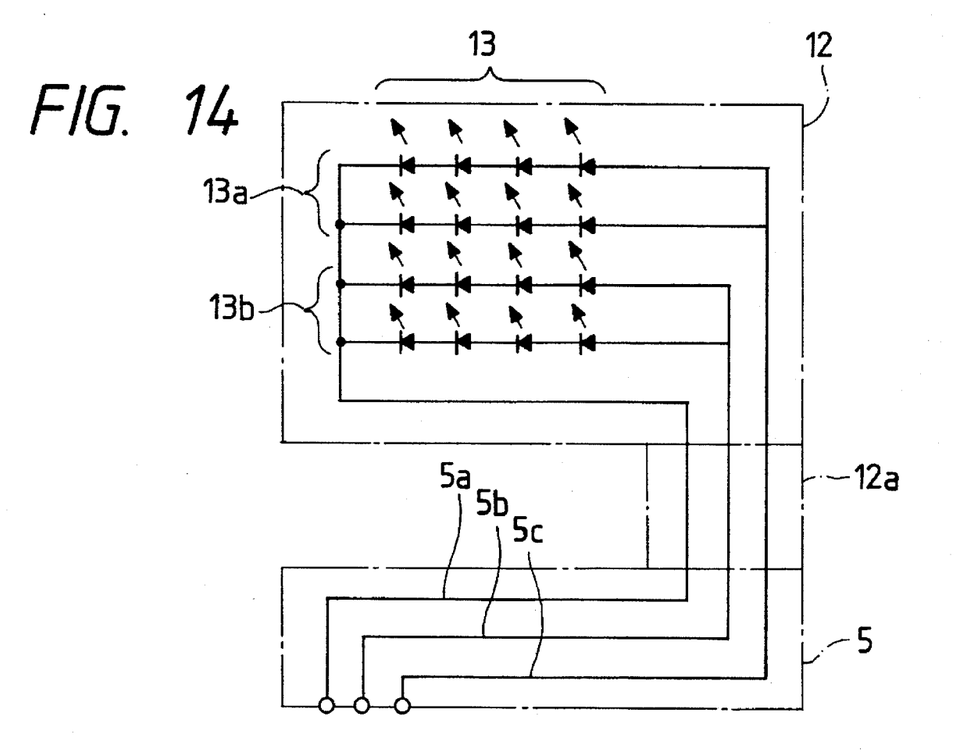
FIG. 14 is a circuit diagram which shows a modification of the conductive pattern as shown in FIG. 8.

Referring to FIG. 14, there is shown a fourth embodiment of the invention. This embodiment is different from the above embodiments in that a lead wire 5s is further printed on the FPCs 12, 12a, and 5. The lead wire 5c connects with LEDs 13a which emit light different in color from that of LEDs 13b. With this arrangement, it is possible that the indicating pointer 1 projects light in different colors according to angular positions of the indicating pointer 1 on the display plate 4. The LEDs 13a may alternatively be provided with LEDs which emit light different in brightness from that of the LEDs 13b so that the brightness of light is controlled according to the angular positions of the indicating pointer 1 on the display plate 4.

Figure 15:
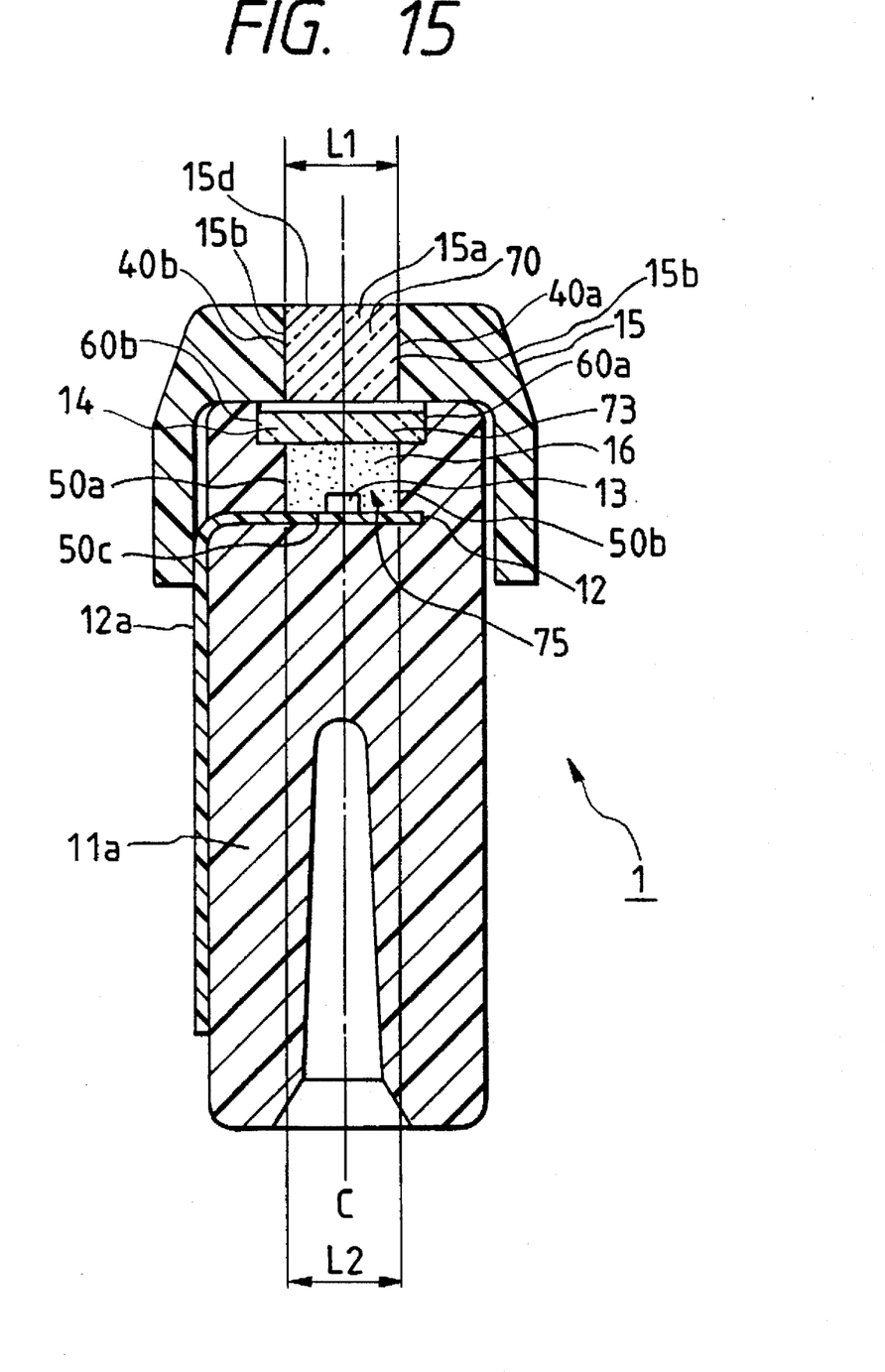
FIG. 15 is a cross sectional view which shows a first modification of an indicating pointer.

Referring to FIG. 15, there is shown a modification of the indicating pointer 1 which is different from the above embodiment in structure of the cover 15.

The cover 15 has formed therein a groove 70 having a constant width L1 defined by side walls 40a and 40b extending substantially parallel to one another in a vertical direction, as viewed in the drawing. The semitransparent strip member 15a is made of a square rod having the same width L1 as that of the groove 70 of the cover 15 and is fitted in the groove 70. The semitransparent strip member 15a has side walls 15b which are both substantially oriented parallel to one another along the vertical center line C of the housing 11 (i.e., the boss 11a).

The housing 11, similar to the above embodiments, has formed therein a groove 73 defined by shoulder portions 60a and 60b and a groove 75 defined by side walls 50a and 50b and a bottom 50c. The side walls 50a and 50b are oriented parallel to each other to have a constant width L2 which is substantially equal to the width L1 so that the groove 75 of the housing 11 is aligned with the groove 70 of the cover 15. The bottom 50c of the groove 75 lies perpendicular to the vertical center line C so that an optical path of the LEDs 13 along which the majority of light beams emitted from the LEDs 13 travel, may coincide with the vertical center line C. In other words, the LEDs 13 are so arranged on the bottom 50c that the side walls 15b of the semitransparent strip member 15a lie symmetrically with respect to the optical path.

Within the groove of the housing 11, the FPC 12 is so disposed that the LEDs 13 are arranged along a given length of the groove 75.

The lens 14 is retained by the shoulder portions 60a and 60b formed in an opening end of the housing 11, and includes, similar to the one shown in FIG. 9, a corrugated surface 14a facing the semitransparent strip member 15a and a flat surface 14b facing the LEDs 13 through the transparent synthetic resin member 16. The corrugated surface 14a includes a plurality of triangle pole-like protrusions each extending perpendicular to the length of the lens 14.

In operation, when the cross coil of the pointer driving unit 2 is energized according to an input signal indicative of an indicating parameter, it will cause the self-luminescent indicating pointer 1 to move to an angle showing the indicating parameter at which a driving torque produced by the pointer driving unit 2 is balanced with reaction torques (i.e., braking torques) acting from the scroll FPC 5 and the hairspring 6 of the pointer driving unit 2.

The lighting current is carried from the lighting circuit (not shown) through the terminal plates 9a and 9b, the scroll FPC 5, and the connecting FPCs 12a and 12 to the LEDs 13 in the indicating pointer 1 so that they project light beams which are, in turn, diffused through the semitransparent strip member 15a out of the indicating pointer 1.

The light beams emitted from the LEDs 13 first enter the transparent synthetic resin member 16 disposed on the FPC 12. Light beams emitted laterally from the LEDs 13 are reflected on the side walls 50a and 50b of the groove 75 (i.e., side walls of the transparent synthetic resin member 16) and most of them travel into the lens 14 so that they are diffused outward from the corrugated surface 14a along the length of the lens 14. The light beams thus diffused by the lens 14 then enter the semitransparent strip member 15a of the cover 15 so that they are projected from the upper surface 15d out of the indicating pointer 1. Part of the light entering the semitransparent strip member 15a is reflected on either of the side walls 15b thereof. The side walls 15b of the semitransparent strip member 15a are, as explained above, both substantially oriented parallel to one another with respect to the given optical path of the LEDs 13 (i.e., the vertical center line C), causing each reflected light beam to reach the upper surface 15d at an incident angle smaller than a critical angle at which total reflection occurs in the semitransparent strip member 15a. Thus, all the light beams reflected on the side walls 15b are radiated out of the semitransparent portion 15a without occurrence of total reflection, thereby ensuring the visibility of pointer deflection over the display plate 4. Additionally, the parallel orientation of both side walls 15b of the semitransparent strip member 15a relative to the optical path of the LEDs 13 permits the light beams produced by the LEDs 13 to reach upper corners of the semitransparent strip member 15a. This is because the provision of the width L1 of the semitransparent portion 15b substantially equal to the width L2 of the groove 75 of the housing 11 prevents the light transmitted through the groove 75 from dispersing in a width direction in the semitransparent strip member 15a, thereby maintaining the brightness of the indicating pointer 1 at a high level.

Figure 16:
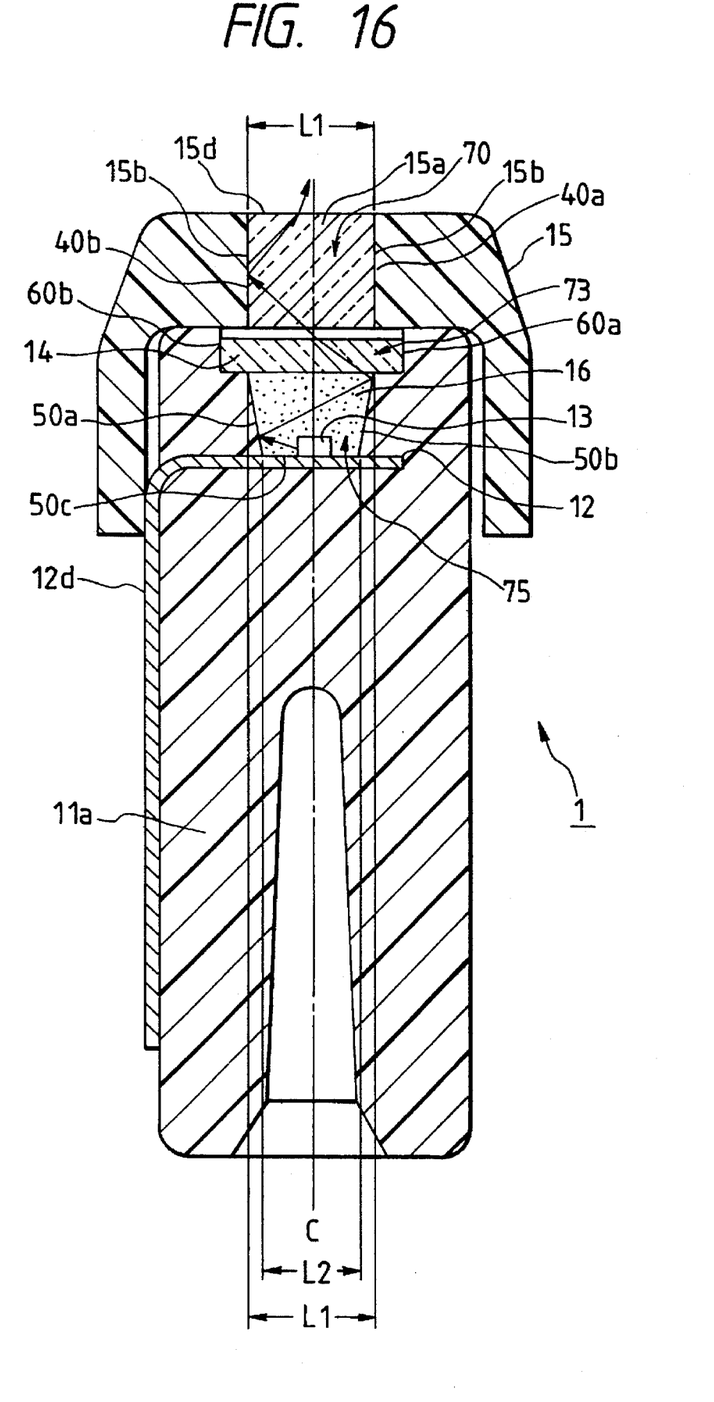
FIG. 16 is a cross sectional view which shows a second modification of an indicating pointer.

Referring to FIG. 16, there is shown a second modification of the indicating pointer 1 which is different from the above pointer structure in the shape of the transparent synthetic resin member 16. Other arrangements are the same as those of the above embodiment and explanation thereof in detail will be omitted there.

The transparent synthetic resin member 16, as can be seen from the drawing, is of trapezoid in cross section having tapered side walls formed symmetrically. Similarly, the groove 75 in the housing 11 has tapered side walls 50a and 50b oriented upward at a given angle to have an upper width L1 of the groove 75 set greater than a lower width L2 thereof. In other words, an upper opening end of the groove 75 is greater in area than a bottom thereof. Likewise to the one shown in FIG. 15, the semitransparent strip member 15a of the cover 15 has the same width L1 along its height.

In operation, some of light beams emitted from the LEDs 13 travel laterally so that they reach the side walls 50a and 50b of the groove 75. The light beams having reached the side walls 50a and 50b are all reflected upward, as shown by an arrow in FIG. 16, without being left in the transparent strip member 16 and then are transmitted through the lens 14 and the semitransparent strip member 15a out of the indicating pointer 1 with high efficiency, enhancing the brightness of the indicating pointer 1 further.

Figure 17:
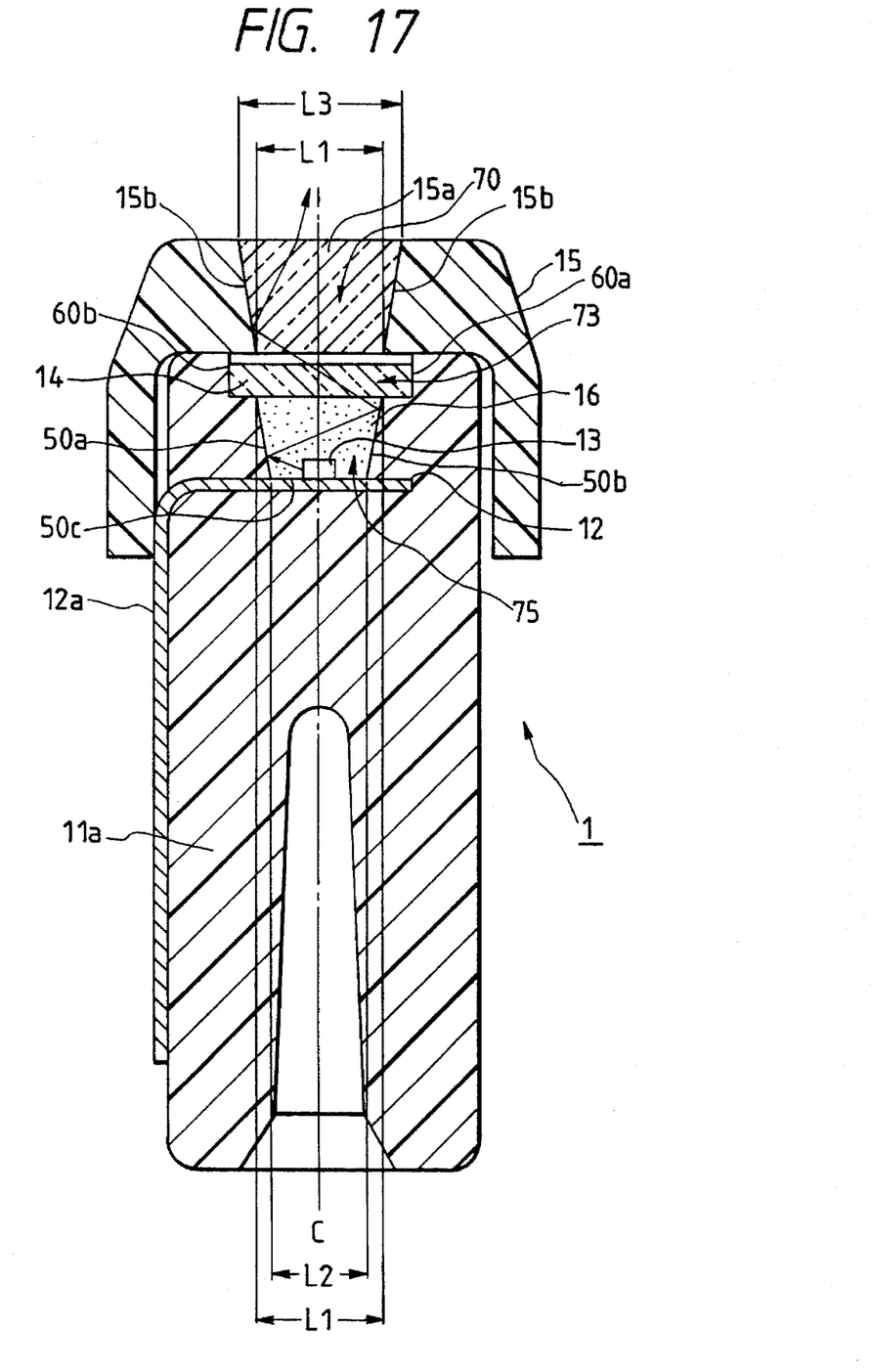
FIG. 17 is a cross sectional view which shows a third modification of an indicating pointer.

FIG. 17 shows a third modification of the indicating pointer 1 which is different from the above second modification in that the semitransparent strip member 15a has tapered side surfaces 15b which are so oriented upward in a symmetrical fashion with respect to the given optical path of the LEDs 13 that an upper width L3 thereof is set greater than a lower width L1 equal to an upper width of the transparent synthetic resin member 16. Similarly, the groove 70 of the cover 15 has tapered side surfaces 40a and 40b contacting the side walls of the semitransparent strip member 15a.

In operation, light beams which have reached the side walls 15b of the semitransparent strip member 15a after passing through the transparent synthetic resin member 16 and the lens 14, are reflected upward. These reflected beams reach the upper surface 15d at an incident angle less than the critical angle so that they are all projected out of the indicating pointer 1. It will be appreciated that the upward oriented side walls of the semitransparent strip member 15a permit all incoming light beams to be directed out of the indicating pointer 1.

Figure 18:
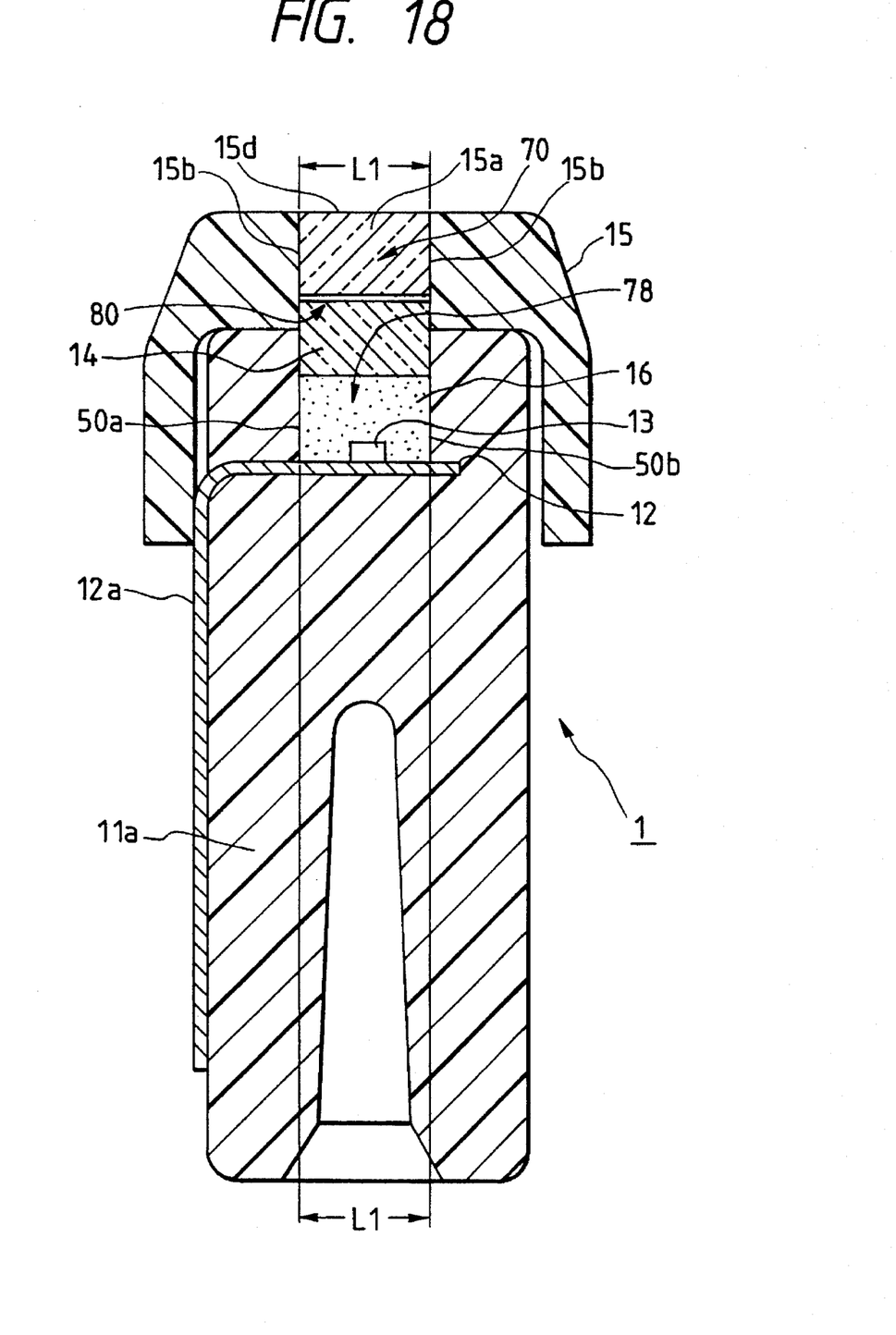
FIG. 18 is a cross sectional view which shows a fourth modification of an indicating pointer.

FIG. 18 shows a fourth modification of the indicating pointer 1.

The cover 15 has formed therein a groove 70 having a width L1, while the housing 11 also has formed therein a groove 78 having the same width L1. The grooves 70 and the 78 are arranged in vertical alignment with each other. In addition, the semitransparent strip member 15a, the transparent synthetic resin member 16, and the lens 14 have the same width L1. The semitransparent strip member 15a is fitted in the groove 70 so that it lies flush with an upper surface of the cover 15 to form a recessed lower portion 80 which serves to position the cover 15 precisely when assembling the indicating pointer 1, while the transparent synthetic resin member 16 is disposed in the groove 78. The lens 14 is partially inserted into the recessed lower portion 80 formed in the grooves 70, while the remainder thereof is fitted in the groove 78. As clearly shown in FIG. 18, the semitransparent strip member 15a is of substantially rectangular configuration in cross section. Similar to the first modification, the side walls 40a, 40b, 50a, and 50b extend parallel to the given optical path of the LEDs 13 (i.e., the vertical center line C of the housing 11).

With the above arrangements, all light beams radiated from the LEDs 13 are effectively projected from the semitransparent strip member 15a without being left in the lens 14.

Figure 19:
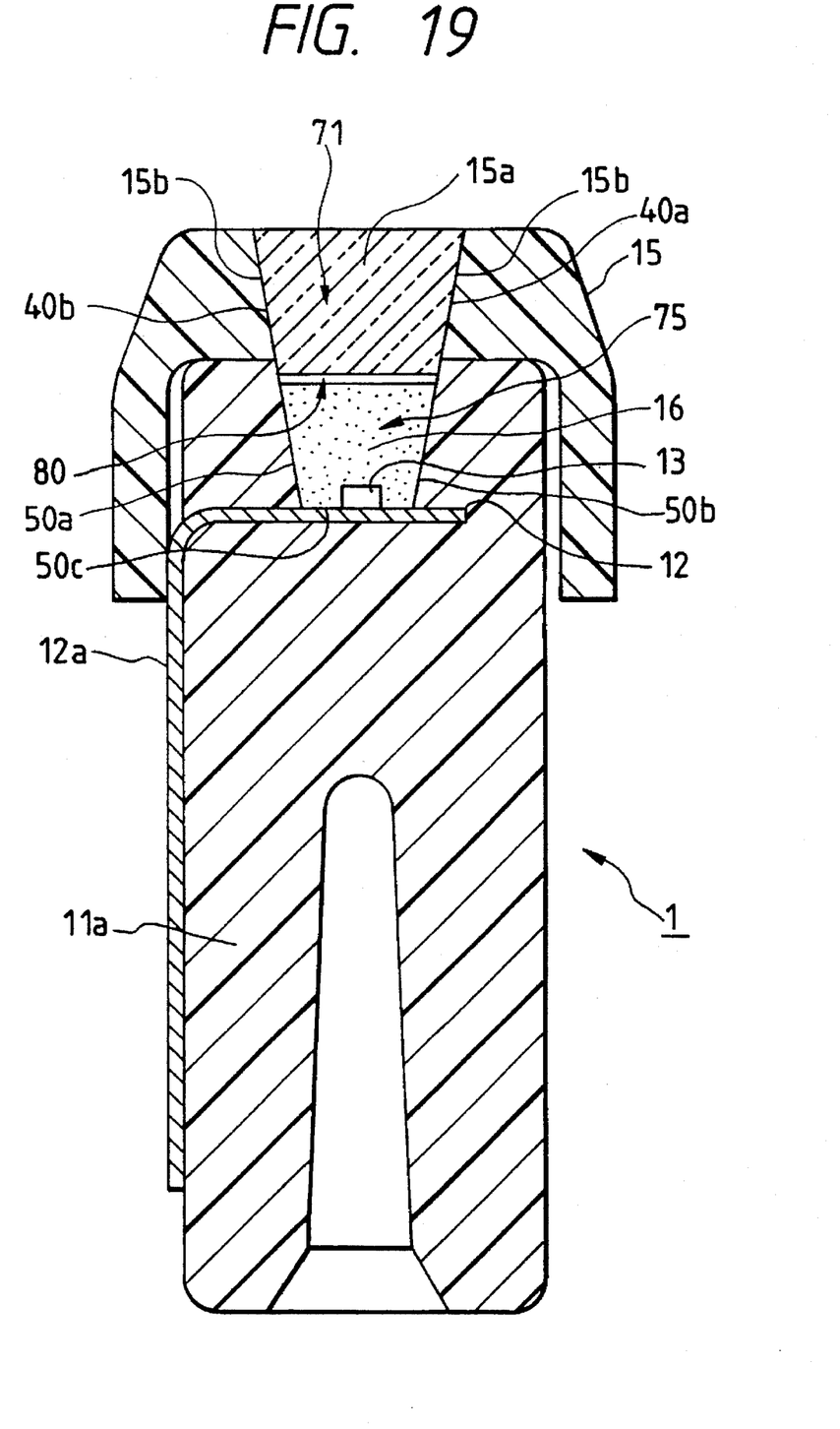
FIG. 19 is a cross sectional view which shows a fifth modification of an indicating pointer.

FIG. 19 shows a fifth modification of the indicating pointer 1.

The cover 15 has formed therein a tapered groove 71 having inclined side walls 40a and 40b oriented upward. Similarly, the housing 11 also has formed therein a tapered groove 75 having inclined side walls 50a and 50b, oriented upward, continuing from the side walls 40a and 40b. The semitransparent strip member 15a has tapered side surfaces which are fitted in the groove 71 so as to partially project downward. Similarly, the transparent synthetic resin member 16 also has tapered side surfaces contoured to the side walls 50a and 50b of the groove 75, and is so fitted in the groove 75 as to form a recessed portion 80 on an upper surface thereof which the projecting portion of the semitransparent strip member 15a engage for facilitating installation of the cover 15 when assembling the indicating pointer 1. The indicating pointer 1 of this embodiment, as apparent from the drawing, does not use the lens 14. The lens 14 may not be used as long as there is no need for uniform dispersion of light along the length of the indicating pointer 1.

When using the lens 14, it is advisable that the corrugated surface 14a of the lens 14 be arranged within the groove 78 completely to form a recessed portion thereon for engagement with the projecting portion of the semitransparent strip member 15a in order to facilitate installation of the cover 15 on the housing 11 during assembly of the indicating pointer 1.

Additionally, an inclined angle of the side walls 40a and 40b of the groove 71 may differ from that of the side walls 50a and 50b of the groove 75. In this case, the width of the lower surface of the semitransparent strip member 15a is preferably set equal to that of an upper opening portion of the groove 75 for directing all light beams emitted from the LEDs 13 into the semitransparent strip member 15a.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims. For example, while in the above embodiments, the side walls of the semitransparent strip member 15a is made flat, it may alternatively be provided with fine protrusions. This arrangement also directs light reflected on the side walls of the semitransparent strip member 15a upward so that it is projected out of the indicating pointer 1 with high efficiency. Similarly, fine protrusions may be formed on the side walls 40a, 40b, 50a, and 50b of the grooves 70 and 78.

What is claimed is:

1. A self-luminescent indicator apparatus comprising:
   an indicating pointer having a housing and a cover for covering the housing, the housing having formed therein a groove, the groove being defined by two opposing groove side walls which each have upper and lower longitudinal edges, and which are separated apart by a first width W1 at their respective lower longitudinal edges and by a second width W2 at their respective upper longitudinal edges;
   a luminescent element disposed in the groove of the housing of said indicating pointer;
   means for conducting energy to said luminescent element to cause it to emit light; and
   a semitransparent member disposed within the cover of said indicating pointer so as to disperse light emitted from said luminescent element out of said indicating pointer, said semitransparent member having two opposing semitransparent member side walls which each have upper and lower longitudinal edges, and which are separated apart by a first width W3 at their respective lower longitudinal edges and by a second width W4 at their respective upper longitudinal edges,
   wherein the first and second widths W1 and W2 of the groove of said indicating pointer and the first and second widths W3 and W4 of said semitransparent member have the following relationship:

W1<W2<W3<W4.

2. A self-luminescent indicator apparatus as set forth in claim 1, wherein the side walls of said semitransparent member are so oriented that the light, emitted from said luminescent element, falling on the side walls reaches an end of said semitransparent member through which the light exits without occurrence of total reflection.

3. A self-luminescent indicator apparatus as set forth in claim 1, wherein the side walls of said semitransparent member are oriented symmetrically with respect to a given center line of said luminescent element.

4. A self-luminescent indicator apparatus as set forth in claim 3, wherein the side walls of said semitransparent member are both inclined at a given angle to a bottom of the groove on which said luminescent element is disposed.

5. A self-luminescent indicator apparatus as set forth in claim 1, further comprising a lens interposed in the groove of the housing between the cover of said indicating pointer and said luminescent element for directing the light emitted from said luminescent element to said semitransparent member.

6. A self-luminescent indicator apparatus as set forth in claim 1, wherein the side walls of said semitransparent member are oriented parallel to the center line of the groove of the housing which extends perpendicular to a bottom of the groove on which said luminescent element is disposed.

7. A self-luminescent indicator apparatus as set forth in claim 1, wherein the groove of the housing has an opening oriented to said semitransparent member, the opening having a width substantially equal to the width W2, a light-incident surface of said semitransparent member facing the groove having a width which is substantially equal to the width W2.

8. A self-luminescent indicator apparatus as set forth in claim 1, wherein the groove of the housing has an opening through which the light emitted from said luminescent element travels toward said semitransparent member, the opening being in conformity with an end of said semitransparent member for allowing the light to travel therethrough.

9. A self-luminescent indicator apparatus as set forth in claim 1, wherein the groove side walls of the housing have flat surfaces which are oriented so as to direct the light emitted from said luminescent element to said semitransparent member.

10. A self-luminescent indicator apparatus as set forth in claim 9, wherein the groove of the housing has a first end which the light emitted from said luminescent element enter and a second end from which the incoming light exits, the second end being greater in area than the first end.

11. A self-luminescent indicator apparatus as set forth in claim 1, wherein said luminescent element includes a plurality of light-emitting elements arranged along a given length of the groove.

12. A self-luminescent indicator apparatus as set forth in claim 11, further comprising a lens interposed in the housing between the cover of said indicating pointer and said luminescent element, said lens having a flat surface through which light emitted from said luminescent element is transmitted and a corrugated surface which projects the light transmitted through the flat surface out of said indicating pointer.

13. A self-luminescent indicator apparatus as set forth in claim 12, wherein the corrugated surface of said lens is arranged opposite the flat surface and is formed with a plurality of triangle pole-like protrusions facing the cover of said indicating pointer.

14. A self-luminescent indicator apparatus as set forth in claim 1, wherein the cover has a groove in which said semitransparent member is fitted and which has side walls extending parallel to each other with respect to a given optical path of said luminescent element, the side walls of the groove of the housing being oriented in alignment with the side walls of the groove of the cover.

15. A self-luminescent indicator apparatus as set forth in claim 14, further comprising a lens which is partly inserted into both the grooves of the cover and the housing for directing the light emitted from said luminescent element to said semitransparent member.

16. A self-luminescent indicator apparatus as set forth in claim 1, wherein the cover has a groove in which said semitransparent member is fitted and which has side walls inclined relative to a given optical path of said luminescent element at a given angle so as to direct the light falling thereon out of said indicating pointer, the side walls of the groove of the housing being also inclined relative to the given optical path of said luminescent element so as to direct the light falling thereon to an end of said semitransparent member which the light enters.

17. A self-luminescent indicator apparatus as set forth in claim 16, wherein said semitransparent member is partially inserted into the groove of the housing.

18. A self-luminescent indicator apparatus as set forth in claim 1, wherein the groove side walls of the housing extend substantially parallel to each other.

19. A self-luminescent indicator apparatus as set forth in claim 1, wherein the semitransparent member side walls extend substantially parallel to each other.

20. A self-luminescent indicator apparatus as set forth in claim 1, wherein the groove side walls of the housing extend substantially parallel to each other, and wherein the semitransparent member side walls extend substantially parallel to each other.

21. A self-luminescent indicator apparatus as set forth in claim 20, wherein the widths W1, W2, W3 and W4 are substantially equal to each other.

22. A self-luminescent indicator apparatus as set forth in claim 1, wherein the width W1 is smaller than the widths W2, W3, and W4.

23. A self-luminescent indicator apparatus as set forth in claim 22, wherein the groove side walls of the housing are tapered so as to be oriented upward in a symmetrical fashion with respect to a given optical path of light emitted from said luminescent element.

24. A self-luminescent indicator apparatus as set forth in claim 1, wherein the semitransparent member side walls are tapered so as to be oriented upward in a symmetrical fashion with respect to a given optical path of light emitted from said luminescent element such that the width W3 is smaller than the width W4.

25. A self-luminescent indicator apparatus as set forth in claim 1, wherein the groove side walls of the housing are tapered so as to be oriented such that the width W1 is smaller than the width W2, and wherein the semitransparent member side walls are tapered so as to be oriented such that the width W3 is smaller than the width W4.

26. A self-luminescent indicator apparatus comprising:

an indicating pointer having a given length, including a housing and a cover for covering the housing, the housing having formed therein inner side walls which define a groove extending along the given length of said indicating pointer;

a luminescent element and disposed in the groove of the housing of said indicating pointer;

means for conducting energy to said luminescent element to cause it to emit light; and a semitransparent member having a given length, disposed within the cover of said indicating pointer so as to disperse light emitted from said luminescent element out of said indicating pointer, said semitransparent member having two opposing side walls oriented geometrically with respect to an optical path of light emitted from said luminescent element so as to direct light falling on the side walls outward from said indicating pointer, the side walls extending along the given length of said semitransparent member, each having upper and lower and longitudinal edges, the side walls being separated apart by a first width W1 at their their respective lower longitudinal edges and by a second width W2 at their respective upper longitudinal edges, the first width W1 and the second width W2 being substantially equal to each other.

27. A self-luminescent indicator apparatus as set forth in claim 26, wherein the inner side walls defining the groove of the housing of said indicating pointer each have upper and lower longitudinal edges, the inner side walls facing each other while being separated apart by a first width W3 at their lower longitudinal edges and by a second width W4 at their upper longitudinal edges, and wherein the first and second widths W1 and W2 of said semitransparent member and the first and second widths W3 and W4 of the groove of the housing have the following relationship:

$$W3<W4<W1<W2.$$

28. A self-luminescent indicator apparatus as set forth in claim 27, wherein the inner side walls of the groove of the housing angle away from each other from their lower longitudinal edges to their upper longitudinal edges so that the width W4 is greater than the width W3.

* * * * *